United States Patent
Clune et al.

[15] 3,660,169
[45] May 2, 1972

[54] BATTERY PACKAGING DEVICE

[72] Inventors: Richard R. Clune, Ardsley; Gordon E. Kaye, South Salem, both of N.Y.

[73] Assignee: P. R. Mallory & Co., Inc., Indianapolis, Ind.

[22] Filed: Apr. 22, 1970

[21] Appl. No.: 30,744

[52] U.S. Cl. .............................. 136/111, 136/166, 136/173
[51] Int. Cl. ........................................................ H01m 1/02
[58] Field of Search .................. 136/110, 111, 166, 173, 132

[56] References Cited

UNITED STATES PATENTS

| | | | |
|---|---|---|---|
| 1,568,927 | 1/1926 | Stone et al. | 136/173 |
| 1,879,595 | 9/1932 | Voorhees | 136/173 |
| 3,535,996 | 10/1970 | Winkler et al. | 136/173 |
| 3,537,909 | 11/1970 | Horton | 136/173 |
| 1,627,264 | 5/1927 | Baird | 136/173 |

Primary Examiner—Donald L. Walton
Attorney—Robert Levine

[57] ABSTRACT

A two-part molded cartridge utilizes one part as an assembly tray or shell for assembling three electric cells in position to permit electrical interconnections between the cells, and to support contact terminal surfaces for connection to external circuit contact terminals, and then utilizes the second molded part as a cover, and the two parts are then sealed to constitute a housing for the cells as a battery unit.

12 Claims, 7 Drawing Figures

PATENTED MAY 2 1972 3,660,169

INVENTOR
Richard K. Clune
Gordon G. Kaye
BY
ATTORNEY

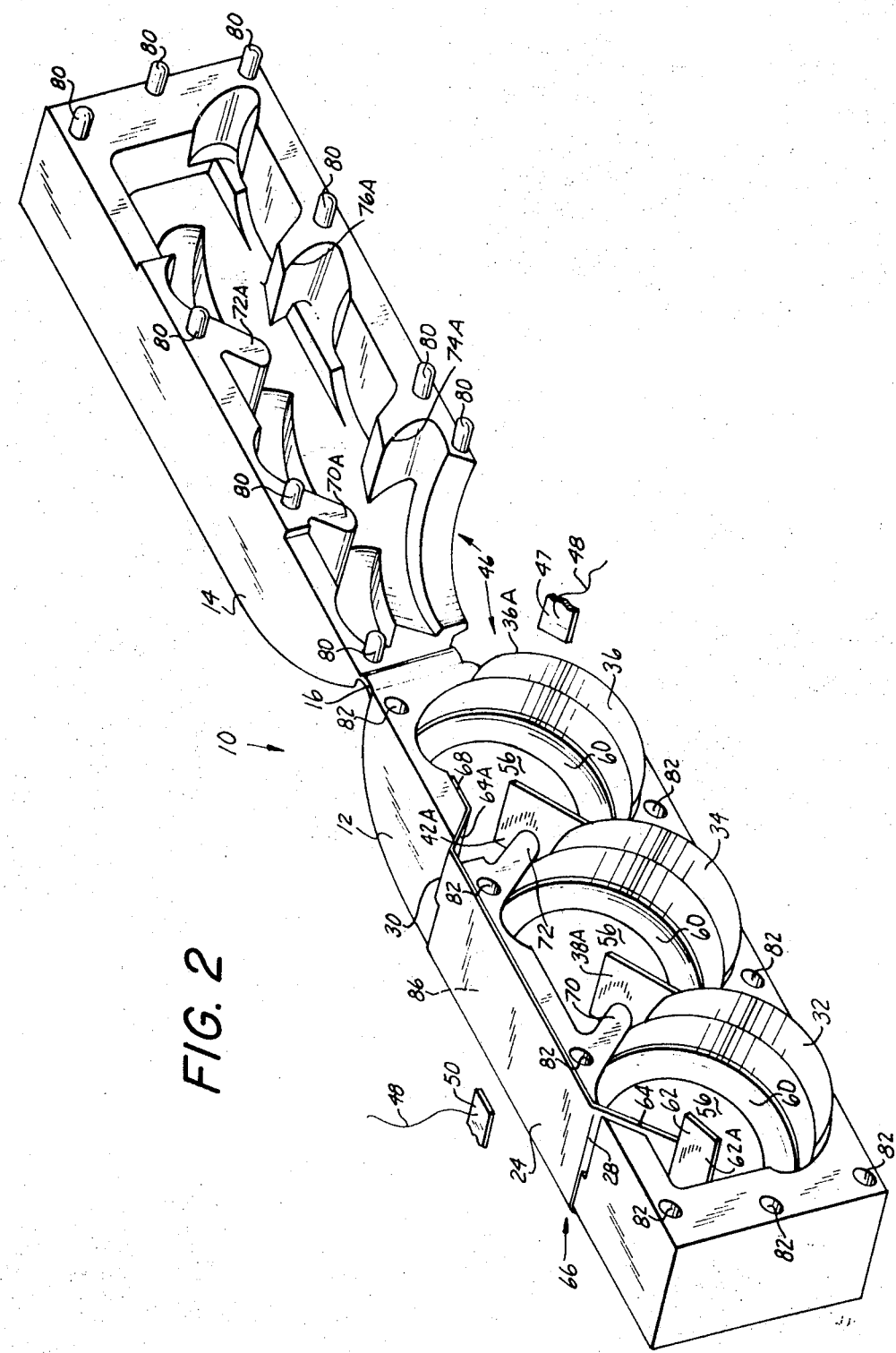

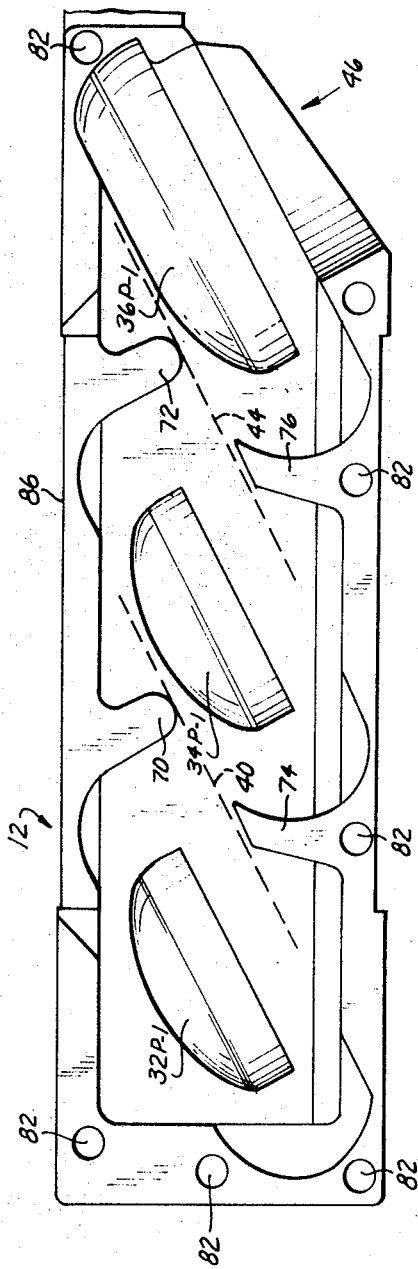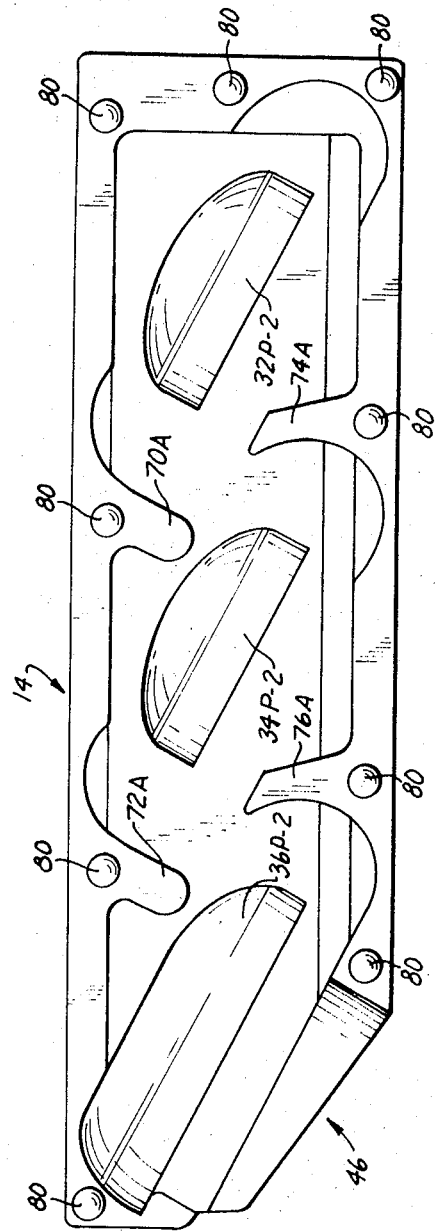
FIG. 6
FIG. 7

BATTERY PACKAGING DEVICE

This invention relates to a packaged battery consisting of plurality of small unitary cells disposed in a molded cartridge as a housing for the cells, to serve as a unit to be readily loaded into the space of a receiving compartment of corresponding size so the cartridge may be inserted into the space to engage suitable contact elements in the space to connect the battery into an external circuit.

There are many applications in which it is desirable to have a battery available as a cartridge, without the need of manipulatable connections or electrical terminals beyond the engagement of suitable surface terminals on the cartridge engaging correspondingly placed surface terminals in the space to be occupied by the battery cartridge. One such application is a camera in which the battery is employed in a system to provide a sharp electrical pulse of current for energizing a flash tube.

The usual problem with any such application is to fit the battery cartridge into a space that is already limited by the dimensions of a closely packed structure either of the camera or of some other device which is usually designed to a minimum limiting dimension sufficiently adequate merely to accomplish the functions of the device itself, such as the indicated camera.

A feature of the present invention is that the molded cartridge, which is to serve as the housing for the battery cells, is formed in two parts, so that the cells may be disposed and supported in one part of the housing in a manner to permit properly electrically connecting them to each other, as a preliminary step in the manufacturing assembling, thereby permitting the use of the molded cartridge as an assembling and holding tray for the electric cells during the manufacturing assembly, and, then permitting the two molded cartridge halves to be joined as a final enclosing housing for the cells.

Such utilization of the molded cartridge halves, for assembling and holding the cells in place during the manufacturing assembly and in place to permit manufacturing operations to be performed on the cells while they are being transported or held in the cartridge halves as trays, with the subsequent closing and sealing of the two halves as a final enclosing housing for the cells, simplifies the manufacturing operation, reduces the number of otherwise necessary manual operations, and greatly reduces the cost of the final product. Moreover, the quality of the final product will be uniform and optimum, insofar as the assembled positions and the relative arrangement of the cells constitute factors in proper assembly and operation of the cells as a complete battery.

That feature of the invention, involving the use of one half of the molded cartridge for supporting the cells as assembled therein, as a carrier to permit manufacturing operations on the cells, guides each cell to be seated in a receiving pocket in the half shell so as to expose sufficient area of a top plate terminal area on each of the cells, to permit access to such exposed area with a small double-pronged spot-welding tool to enable welding operations to be easily performed on the cells after they are placed in their respective pockets.

A collateral feature is the arrangement of the cells in echelon formation with the bottom plane of a preceding cell substantially co-planar with the top terminal plane of the next succeeding cell in the sequence of the cells in the housing. With such co-planar arrangement of the surfaces, an intercell strip of conducting metal that has been previously welded at one end to the bottom surface of a preceding cell in the sequence will then overly and engage the top surface of the next succeeding cell in an area that is exposed and out of the pocket or cavity for the cell, in such manner, that the portion of the intercell conducting strip that engages the top of the next succeeding cell is exposed and out in the open, and is available to access by a double-pronged welding tool so that the connecting strip may be easily and readily spot-welded with two spot welds to the top terminal surface of succeeding cells in the sequence.

The front cell in the sequence of cells in the battery, is provided with a larger terminal strip that is welded to the top of the front cell, and that larger strip extends backward and outward through an appropriate slot in the adjacent wall of the cartridge shell, and that strip is suitably held down to the side surface of the cartridge shell to serve as a sliding contact when inserted into a receiving compartment for electrical contact.

The final cell in the sequence is disposed and supported in an end cavity of the cartridge with the cartridge wall cut away at that region to provide an opening through which the bottom surface of that final cell will extend outward through the cartridge and engage an appropriately disposed contact terminal in the receiving chambers for the cartridge.

The second half shell of the molded cartridge serves as a cover or closure, and is provided with similar cavities or pockets, appropriately dimensioned and disposed so that that second half shell of the cartridge may be folded over onto the first half shell of the cartridge already containing the cells, and the two cartridge half shells are then directed into proper fitting engagement by suitable locating pins on one cartridge half shell fitting into receiving holes on the other cartridge half shell.

Thus, when the cartridge is effectively closed and formed ready for use, one outer strip on the cartridge serves as one terminal for one end of the battery, and the exposed bottom surface of the end cell of the series serves as the other terminal for the other end of the battery. The battery is connected into an external circuit simply by being slipped into a cartridge-receiving space provided with two terminal contacts to be slidingly engaged by the two terminal surfaces of the cartridge battery.

A further feature of the invention is the provision of internal bosses in the two half shells of the molded cartridge, that serve both to strengthen the half shells of the cartridge and also to support the conducting and connecting intercell strips between successive cells in the series, so those connecting strips are supported out of possible short circuiting position which could occur if the strips were permitted to be more loosely positioned where they could engage the top edge of the encircling can that is part of the structure of each cell.

The disposition of the respective cells and the construction of the molded cartridge half shells are described in more detail in the following description, taken together with the drawings, in which FIG. 1 is a schematic elevational view representing the cartridge shell when closed to serve as a housing for the three cells as here employed to constitute a battery;

FIG. 2 is a perspective elevational view of the two cartridge halves, shown in open position, with the three cells already in position in their pockets in one cartridge half.

Figure 4:
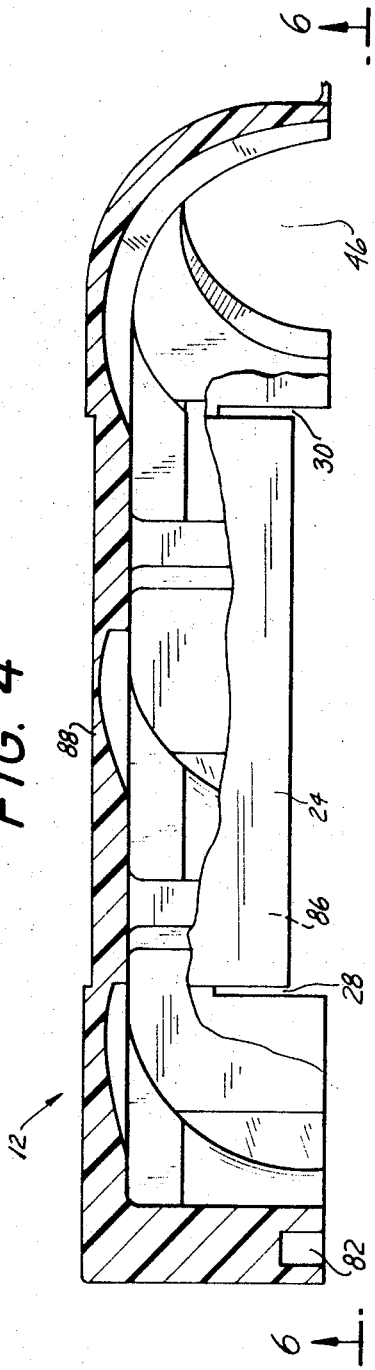
Figure 5:
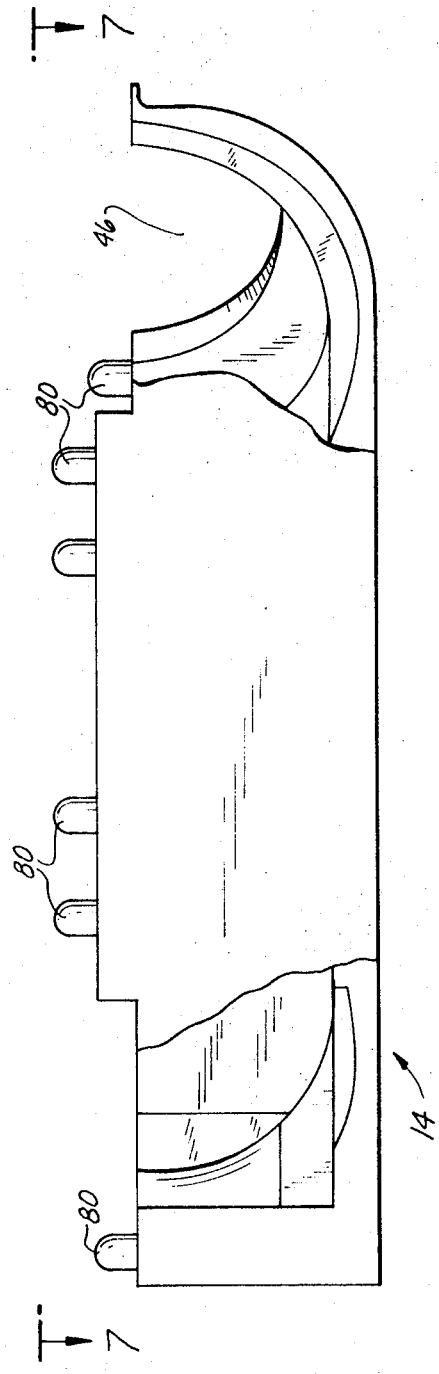

FIG. 4 is a side view, partially in elevation and partially in section, with parts broken away, to show certain construction features, particularly the pin receiving hole at one end of the half-shell and the opening in the back wall through which the bottom terminal surface of the third or final cell in the sequence will be exposed for electrical engagement with a suitably positioned contact element outside of the cartridge;

FIG. 5 is a side elevational view, with the portions broken away, of the other half shell of the cartridge which is to cooperate with the half shell of the cartridge shown in FIG. 4, and the view in FIG. 5 shows the locating and positioning guide pins that are to fit into appropriate holes within the half shell of FIG. 4, and also shows the bottom half of the opening at the rear of the housing through which the bottom terminal surface of the third or final cell in the sequence will protrude through the back wall of the closed cartridge for engagement with a suitably positioned electrical contact for an external circuit;

FIG. 6 shows a plan view of one half shell of the molded cartridge and discloses several pockets for receiving the respective cells of the battery;

FIG. 7 is a similar view of the other half shell of the cartridge, which will fit onto the half shell of FIG. 6 to provide a closed housing for the three cells that will make up the battery.

Figure 1:
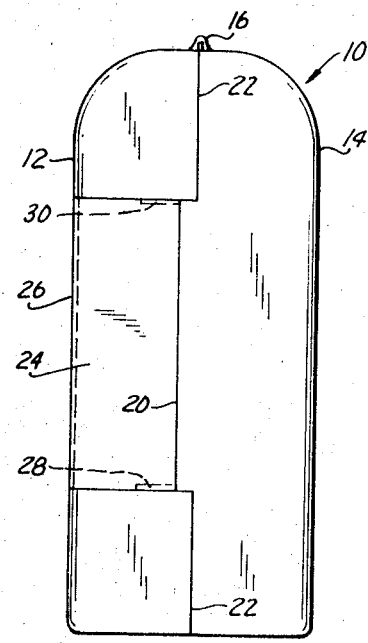

As shown generally in FIG. 1, a closed molded cartridge 10, according to the principles of this invention, comprises two molded half shells 12 and 14, which may be originally molded as a unit including a hinge section 16, but need not be, in which case the two half shells 12 and 14 are made in separate operations.

The cartridge 10 as shown in its final form with the cells inclosed therein are formed so they will fit together, so the two cartridge half-shells will be closely fitted together along a parting plane 22 along which the two half shells 12 and 14 may be suitably bonded by an appropriate cementing agent, or by a seal established by a suitable ultrasonic force.

In order that the cartridge may fit directly into a space fitted with terminal electrodes for an electric circuit, the cartridge is shown provided with a flat surface outer contact strip represented by a strip 24 of conducting material, which is shaped to be wrapped around the body of the cartridge 10 alongside the surface 26. To aid in holding the outer contact strip 24 in flat position on the base surface 26 of the molded cartridge 10, the outer contact strip 24 is held down by one end element that extends up through a slot 28, and the other end of the outer contact strip 24 is held down by an end element that extends down through and is clinched under a slot 30 at the opposite end of the outer contact strip 24.

In FIG. 2, a loaded cartridge is shown with the two half shells of the cartridge in open extended position. Both half shells 12 and 14 of the cartridge are shown joined by the hinge element 16, which is optional. Three cells 32, 34 and 36 are shown positioned in the cartridge half shell 12, in their respective pockets that are shown more clearly in the plan view of FIG. 6.

Figure 3:
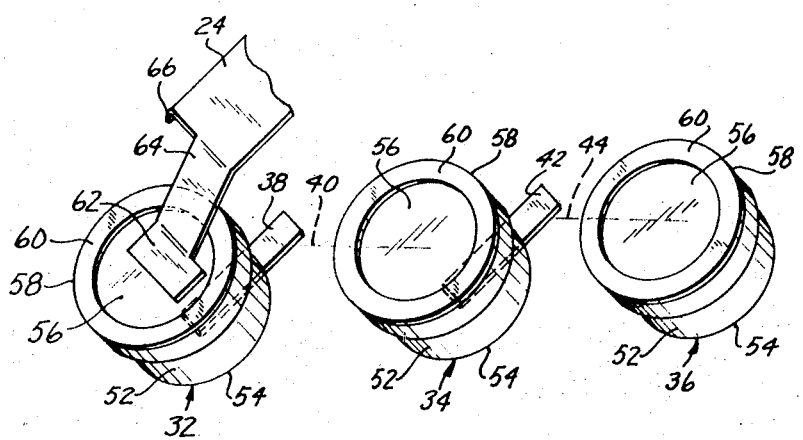
FIG. 3 is a schematic view showing the three cells in a spaced arrangement with a contact strip on the top surface of the first cell, and with a conducting intercell strip indicated between the first two cells and a similar strip between the second and the third cell.

In order to better explain the electrical connections between the three cells 32, 34 and 36, to function as a battery, reference is made to FIG. 3, in which the three cells 32, 34 and 36 are shown schematically, and relatively separated, and inclined in a manner to illustrate or imply how a conductive intercell connecting strip 38 is welded at one end to the bottom terminal surface of the can of first cell 32, and then extends in assembly in the direction along broken line 40 to the top terminal surface of the cell 34, to be there welded for good electrical connection, according to one of the features of this invention.

In similar manner, an intercell connecting strip 42 that is welded at one end to the bottom terminal surface of second or middle cell 34 extends over to the top terminal surface of the cell 36 in a direction along the broken line indicated at 44, and there the strip 42 is welded to the top terminal surface of cell 36.

The third cell 36 is not provided with a bottom conducting or terminal tab. Instead, the bottom surface of cell 36 extends outward through an opening 46 in the rear end wall of the cartridge half shell 12, as indicated more clearly in FIG. 2, to permit engagement of the bottom surface 36A of cell 36 with a suitable stationary electrode 47, supported at appropriate position and connected to an electrical conductor 48 that is part of the external circuit to which the battery is to be connected in the application herein for which it is ultimately intended. The terminal 47 is merely indicated as a structural surface against which the bottom terminal surface 46 of the cell 36 will slidingly engage, when the entire cartridge is loaded and slid into position to engage the contact 47 and a similar contact 50 shown adjacent the top terminal 24 that is supported and mounted on the outer surface of the top of the cartridge half shell 12. For convenience, the external contact 50 is also merely indicated as the surface of a structural element, which will be appropriately supported at proper position in the structure into which the cartridge is inserted for connection to the electric circuit as indicated by the two conductors 48, shown connected to an external circuit to be serviced.

The three cells 32, 34 and 36 are similar in construction. Each cell has an outer cathode can or casing 52 whose bottom surface 54 constitutes a terminal surface of one polarity of the cell. The other terminal surface of the opposite polarity of the cell is represented by a top central plate 56 insulated from the top edge 58 of the cathode can 52 by a suitable insulating medium represented as an annular insulator 60.

As indicated in FIGS. 2 and 3 the flat contact terminal strip 24 embodies a welding or anchoring portion 62 connected to the lower end of connecting portion 64 which continues on to the top layer surface of the contact strip 24 shown with a depending apron 66 by means of which the flat contact strip 24 is held in fixed flat position on the top surface of the half shell 12 by the anchoring portion 62 and the connecting strip 64 and by a similar angular extension 64A on the other end of flat contact strip 24 consisting of an obliquely depending portion 64A and a bracing reaction pressure piece 68.

One of the important features of this invention which was previously referred to is the fact that the welding or anchoring portion 62 of flat contact strip 24 extends outward at its lower free end to exhibit a portion 62A to be accessible to the tips of a welding tool after the cell 32 has been placed in assembled position in the half shell 12 of the cartridge. In similar manner, the intercell connecting strip 38 shown in FIG. 3 as having been previously welded to the bottom of cell 32 now extends upward in the same plane to engage the top terminal plate surface 56 of the cell 34 with a portion 38A exposed outwardly beyond the planar limits of the mating plane of the two half shells 12 and 14, so that the same welding tool which will weld strip 62 to the anode surface 56 of cell 32, can also be moved over to weld the intercell strip portion 38A onto the top terminal surface 56 of the mid cell 34. In similar manner the connecting intercell strip 42 shown in FIG. 3 between cells 34 and 36 extends over to engage an exposed portion of the terminal surface 56 of the third cell of 36 in such manner as to expose a section 42A of the intercell connecting strip 42 so that the exposed section 42A is accessible and available to the welding tips of the welding tool being used, which can then weld the strip 42A to the top terminal surface 56 of the cell 36 while the cell is already assembled in the half shell 12. Thus shell 12 serves both as a holding tray during assembly, and subsequently as part of the housing to enclose the three cells 32, 34 and 36.

As previously mentioned, the top of each cell 32, 34 and 36 has the peripheral rim edge 58 of the can 52 at one polarity, and the top terminal plate 56 of opposite polarity, both separated by insulation 60. Since each intercell strip 38 and 42 crosses over a region of insulation of each cell, where the intercell strip could engage the rim edge 58 and the related terminal plate 56 of cell 34 or 36, each of those two cells must be safeguarded against possible short-circuiting by the associated intercell connecting strip. To assure such safeguarding, each intercell strip 38 and 42 is held in position to prevent the strip from engaging the rim edge 58 of the cell to whose top terminal plate 56 the strip is welded or to be welded. To hold each intercell strip to prevent such harmful engagement of the rim edge 58 of the cell, suitable structures as bosses are formed in the two half shells, as shown in FIGS. 3, 6 and 7.

One of the important features of the invention is that provision of those bosses within the internal spaces of both half shells 12 and 14 of the cartridge, to support the intercell tabs or strips 38 and 42 in an appropriate way to avoid a short circuit condition in the space where the intercell tab bridges the space between the rim edge 58 of the outer can 52 of the cell 34 or 36 for connection to the top terminal surface 56 of the cell 34 or cell 36. Both top and bottom bosses are provided.

The top bosses are shown in the cartridge half shell 12 as bosses 70 and 72 with corresponding matching and mating top bosses 70A and 72A shown in the other half shell 14 of the cartridge. Those two top bosses 70 and 72 tend to hold the related intercell tabs 38 and 42 in position, at least gently pressed, against the related terminal surfaces 56 of the subsequent cells 34 and 36, respectively.

Bottom bosses are provided to support and hold the intercell tabs 38 and 42 from assuming a short circuiting position. They are not indicated in the cartridge half shell 12 but are shown in cartridge half shell 14 as bosses 74A and 76A. The corresponding bottom bosses in the cartridge half shell 12 are not visible in FIG. 2, being hidden by the cells in shell 12. Both sets of top bosses 70 and 72, and 70A and 72A, and the bottom bosses 74 and 76, and 74A and 76A, are clearly illustrated in FIGS. 6 and 7 and will be referred to in the description of those two figures.

FIGS. 2 and 3 illustrate the elements of assembly in manufacture. The tabs 38 and 42 are welded to the bottoms of cells 32 and 34, which are then inserted in their pockets in the half shell 12. The top contact strip 24 is inserted into slots 28 and 30, and the front long edge 66 peened over to lock the strip 24 against backward slip-out. The tab extensions 62A, 38A and 42A are readily accessible and are welded in place by a hand tool for spot welding. The cells are thus electrically connected in series and held in place in their pockets against casual displacement.

The empty half shell 14 may now be applied to mate with half shell 12, either about hinge 16, if it is part of the total cartridge as fabricated, or directly if no hinge is part of the cartridge and the two half-shells are separately formed.

To assure proper mating of half-shells 12 and 14, in closing the cartridge, the covering half-shell 14 is provided with locating pins 80 extending vertically from the mating plane or planes, and the half-shell 12 is provided with receiving and locating holes 82 for those pins 80. The covering half-shell 14 is also provided with pockets, more clearly shown in FIG. 7, to fit properly over the portions of the three cells that extend outward from the holding half-shell 12. The two half-shells may be sealed with a suitable sealing material at their meeting plane or planes, or the sealing may be effected by subjecting the meeting planes to the effect of ultrasonic forces.

FIGS. 4 and 5 show generally how the two half-shells 12 and 14 mate with locating pins 80 fitting into locating holes 82, only one of which is shown.

FIG. 4 also shows the slots 28 and 30, and the sliding contact strip 24 that rests on a slightly depressed surface area 86, on the top of the half-shell 12. That depressed surface area 86 is more clearly shown in FIG. 6. In FIG. 4 is further shown a slightly depressed surface area 88 into which the clinched long side edge 66 of the sliding contact strip 24 is fitted.

FIGS. 4 and 5 also show the rear end opening 46 constituted by the two semi-circular cut-outs in the two half-shells 12 and 14, to provide the opening through which the bottom terminal surface 36A of the final cell 36 in the battery may protrude to engage an external circuit terminal, indicated as 47 in FIG. 2.

FIG. 6 shows the pockets 32 P-1, 34 P-1 and 36 P-1 for the respective cells 32, 34 and 36. The broken lines 40 and 44 correspond to those lines in FIG. 3 that represent the loci along which the intercell tabs 38 and 42 lie. The bosses 70, 72, 74 and 76 are also shown.

FIG. 7 shows the complementary bosses 70A, 72A, 74A and 76A that match with the bosses 70, 72, 74 and 76, respectively, when the two half-shells are mated for closing. FIG. 7 also shows complementary pockets 32 P-2, 34 P-2 and 36 P-2, for receiving and accommodating and covering the protruding portions of cells 32, 34 and 36, to provide a protective housing over the cells.

Thus, this invention discloses a multi-part molded casing, here shown as in two parts, of which one part serves as an assembly tray during manufacture to assemble and permit electrical interconnection of the three cells, after which the second part of the molded casing is placed as a cover on the tray with the cells, and both parts then secured to constitute a closed sealed casing for the three cell battery, with an appropriate terminal at one end of the three-cell battery, and with a terminal surface of the cell at the other end of the battery exposed through an opening in a wall of the closed housing for connection to an external circuit. This feature of utilizing part of the final housing as a working tray during manufacture, assures economy in the manufacturing and assembly operations, due to the minimum of manual operations.

The construction which permits disposing half of each cell in its pocket, while exposing a substantial area of the top terminal surface, permits welding the intercell tabs to those exposed top terminal areas as simple operating steps during manufacture, which is one of the important features of this invention.

The provision of the bottom bosses to raise the intercell tabs to prevent short-circuiting a cell, and of the top bosses for pressing the ends of those tabs into contact ready for welding to the top terminal surface of the related cell assures non-short-circuiting during assembly and thereafter, and at the same time holds the tabs in proper position for welding without further manual intervention.

Various modifications may be made in the structural details to achieve those same features, without departing from the spirit and scope of the invention.

I claim:

1. A battery comprising a two-part casing consisting of a pair of co-fitting molded trays elongate along longitudinal axis and each tray having a plurality of recesses, (for respectively receiving and accommodating) each unit primary cell of predetermined thickness with spaced bottom terminal and top terminal surfaces placed in each of said recesses, said recesses in said trays being disposed effectively relatively parallel in sequence and transverse to said axis at an angle such that the bottom terminal surface of a prior cell in the sequence of said recesses when inserted in its recess in one tray, is substantially co-planar with the top terminal surface of the next succeeding cell in said sequence of said recesses; and electrically conductive means electrically connecting the bottom terminal surface of a forward cell, in said sequence of recesses, to the top terminal surface of a subsequent cell in said sequence; said pair of molded trays being shaped to be engageable and mateable at relatively planar surfaces on each molded tray with corresponding related and facing recesses in said trays co-operating to enclose each unit primary cell.

2. A battery, as in claim 1, comprising, additionally,
an integral hinge link between the two related trays of a casing, to permit the two trays to be held open during insertion and placement of the individual cells in their respective recesses, and then to permit and guide subsequent hingeing movement of the two trays to accomplish the operation of properly mating the two trays to permit them to be sealed as a closed casing for the enclosed cells.

3. A battery, as in claim 2, comprising, additionally, integrally formed locating pins on the mating face of one of said trays,
and pin-receiving holes in the other tray for receiving said pins to mate the two trays as pre-designed.

4. A battery, as in claim 1, in which
said connecting conducting means consists of a thin metallic strip, welded at one end to the bottom terminal surface of a forward cell in said sequence, and disposed to be placeable parallel to, and to engage, the top terminal surface of the subsequent cell in said sequence, to which the strip is to be and is welded during assembly.

5. A battery, as in claim 4, in which
the front cell in said sequence is provided with a terminal element connected to the top terminal surface of said front cell in said sequence, with said terminal element extending through an aperture in a wall of said first tray and lying disposed on an outer surface of said first tray to be accessible for connection to an external electric circuit.

6. A battery, as in claim 4, in which
said first tray is provided with two integrally formed bosses respectively protruding inwardly and respectively from the two side walls and extending to a distance just short of the locus of the plane occupied by each of said metallic connecting strips, to substantially confine said strips to their respective loci.

7. A battery as in claim 6, in which each cell embodies a conducting cylindrical outer shell of one polarity and has its top terminal surface of opposite polarity concentrically disposed within said outer shell adjacent the front axial end of said outer shell and is electrically insulated from said outer shell; and one of said protruding bosses disposed under its related conducting strip has sufficient projection to serve to prevent the related conducting strip from engaging the conductive outer shell of the cell to whose top terminal surface the conducting strip is connected.

8. A battery, as in claim 7, in which
each conducting metal strip to the top terminal surface of a cell after the front cell is exposed outside the recess for the cell in assembly, to enable each said metal strip to be welded to its related top terminal surface by a simple two-prong welding tool in the manufacturing operations for said battery.

9. A battery, as in claim 5, in which
the wall of the two-part casing adjacent the last or final cell in said sequence is opened to expose the bottom terminal surface of said last or final cell in said sequence to permit electrical contact to be made thereto through said wall of said casing.

10. A molded battery container having a hollow peripheral shell with said peripheral shell having one end opening and with said peripheral shell including discrete cell chambers therein; a cell positioned in each discrete cell chamber; said cells having an offset relationship with each other, the bottom surface of one cell overlies the next cell, and being insulated each from its neighbor; a plurality of electrical connections between each of the cells to give a serial output voltage and output terminal connectors including one of said cells for obtaining an output therefrom.

11. A molded battery container having a hollow peripheral shell containing individual cells therein, said shell being adapted to retain the edges of the cells in relationship one to the other in slightly overlapped planes and substantially immovable therein and electrically insulated from each other; electrical connector means between said cells in series giving a desired output voltage; one of said cells being a first output terminal for said output voltage; and said peripheral shell including a second output terminal.

12. The molded battery container of claim 11 wherein the hollow peripheral shell is an enclosing housing.

* * * * *